United States Patent [19]

Young et al.

[11] Patent Number: 5,414,602

[45] Date of Patent: May 9, 1995

[54] VEHICLE HEADLAMP ADJUSTER WITH PIVOTING HOUSING

[75] Inventors: Paul E. Young, Muncie; Rex E. Clendenen, Jr., Anderson; Juan Delbosque, Lapel; Roy Smith, Indianapolis; Gary L. Miller, Lapel; Brian S. Lewis, Middletown, all of Ind.

[73] Assignee: General Motors Corporation, Detroit, Mich.

[21] Appl. No.: 293,620

[22] Filed: Aug. 22, 1994

[51] Int. Cl.$^6$ ............................................. F21M 3/20
[52] U.S. Cl. .................................... 362/66; 362/80; 362/428
[58] Field of Search ............... 362/66, 80, 269, 271, 362/418, 419, 427, 428

[56] References Cited

U.S. PATENT DOCUMENTS

| | | | |
|---|---|---|---|
| 4,893,219 | 1/1990 | Lisak | 362/66 |
| 4,901,208 | 2/1990 | DePetro | 362/66 |
| 4,939,945 | 7/1990 | Ryder et al. | 74/89.13 |
| 5,163,746 | 11/1992 | Lisak | 362/66 |
| 5,165,775 | 11/1992 | Lisak et al. | 362/66 |
| 5,186,532 | 2/1993 | Ryder et al. | 362/66 |

*Primary Examiner*—Richard R. Cole
*Attorney, Agent, or Firm*—Ernest E. Helms

[57] ABSTRACT

A headlamp adjuster is provided which, in a preferred embodiment, includes a mounting panel connected to the vehicle with an aperture and upper and lower ends providing linearly aligned cylindrical surfaces facing the vehicle; a housing fixably connected with upper and lower rods for pivotal entrapment in the cylindrical surfaces of the mounting panel, allowing pivotal movement of the housing with respect to the vehicle panel; a drive screw mounted by the housing and projecting therefrom having an end with a ball pivotally connected to the headlamp in a nonrotational fashion; a first gear with a connected bushing mounted within the housing, the first gear threadably encircling the drive screw being formulated from a nonmetallic material having a bore providing an interference fit with the drive screw, the rotation of the first gear causing translational movement of the drive screw; and a second gear mounted within the housing and held in position by the bushing of the first gear, the second gear being enmeshed with the first gear for imparting a torque to the first gear and the second gear having fixably attached thereto an input shaft extending from the housing for receipt of torsional input to the second gear.

7 Claims, 3 Drawing Sheets

VEHICLE HEADLAMP ADJUSTER WITH PIVOTING HOUSING

FIELD OF THE INVENTION

The field of the present invention is that of automotive vehicle headlamp aiming adjusters. The present invention is particularly useful for horizontal adjusters for composite headlamp assemblies.

BACKGROUND OF THE INVENTION

Vehicle headlamps require horizontal and vertical adjustment to meet U.S. government legal headlamp aiming regulations. The typical aiming arrangement for a vehicle headlamp is based on a three point adjustment system. The headlamp is mounted to a fixed portion or panel of the vehicle. A reflector housing of the headlamp unit is attached to the panel along three rod supports which mount the reflector housing away from the vehicle panel. The first rod provides a fixed pivotal point which typically contacts the reflector housing along a lower end. Along the top end of the reflector housing is an adjustable length rod support typically called a vertical adjuster which typically contacts the reflector housing along the reflector housing top end vertically aligned with the fixed pivotal point. A horizontal adjuster to adjust the reflector housing in a horizontal axis is typically elevationally aligned with the fixed pivotal point and displaced to an extreme left or right end of the fixed pivot point.

To make vertical adjustments, the vertical adjuster will be manipulated in or out, causing the reflector housing to tilt up or down. In a similar fashion, to make horizontal adjustment to the left or right, the horizontal adjuster will be moved in or out. For a more thorough review of the arrangements of various vertical and horizontal adjustments in the three point adjustment system, see U.S. Ser. No. 08/169,464 Nagengast et al, filed Dec. 20, 1993.

To minimize space requirements, especially for the horizontal adjusters, frequently a right angle gear drive is utilized so that an input shaft may be torqued in a region vertically upward from the remainder of the adjuster where it may be more conveniently reached, thereby allowing packaging design constraints in the vehicle which would not allow hand access immediately rearward of the horizontal adjuster.

Prior to the present invention, the overwhelming majority of all automotive vehicles placed the vertical and horizontal adjuster rods in general parallel alignment. Therefore, an adjustment, especially of the horizontal adjuster (which is typically further away from the pivot point than the vertical adjuster), may sometimes cause a slight bending of the adjuster screws. This bending is typically slight and acceptable for most applications.

However, due to design constraints partially due to styling but even more so driven by an effort to minimize packaging and weight in a vehicle to enhance the vehicle's environmental acceptability, certain adjusters must now be located in such a manner that the horizontal and vertical adjuster rods can no longer be parallel mounted with respect to one another. In the nonparallel mounting arrangement, binding becomes a greater potential problem.

SUMMARY OF THE INVENTION

To overcome the above-noted challenges, the present invention is brought forth. Simply stated, the present invention provides an adjuster for a lamp unit of a vehicle headlamp assembly wherein the adjuster may pivot with respect to a panel which is fixably placed within the vehicle and at the same time hold its adjusted position in high vibration environments such as an automotive vehicle engine compartment. The present invention provides an adjuster far less susceptible to any binding and can be readily used in very challenging spatial applications.

DESCRIPTION OF THE PREFERRED EMBODIMENT

Figure 1:
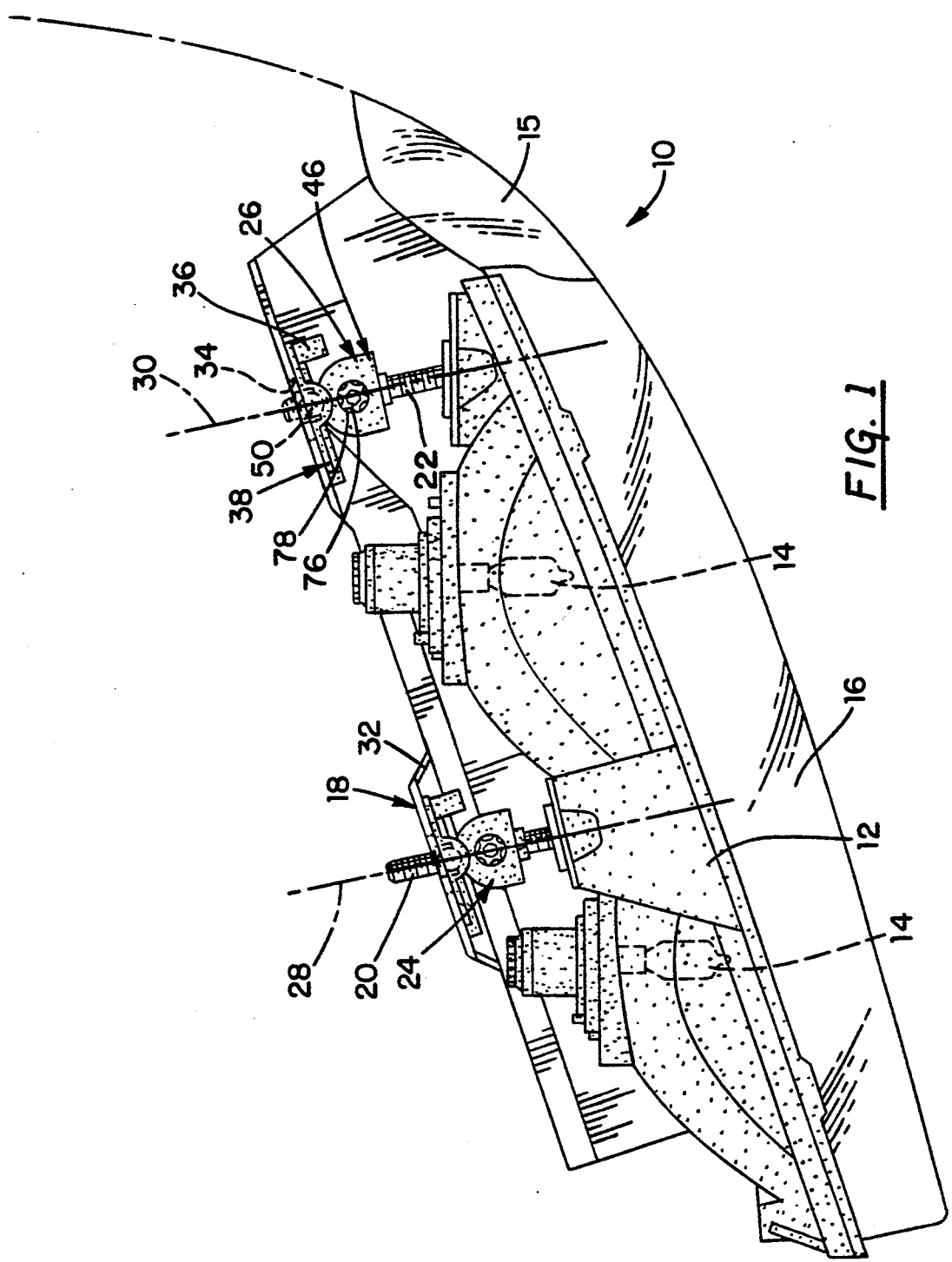
FIG. 1 is a top plane elevational view of an automotive headlamp assembly according to the present invention illustrating both vertical and horizontal adjuster units.
Figure 2:
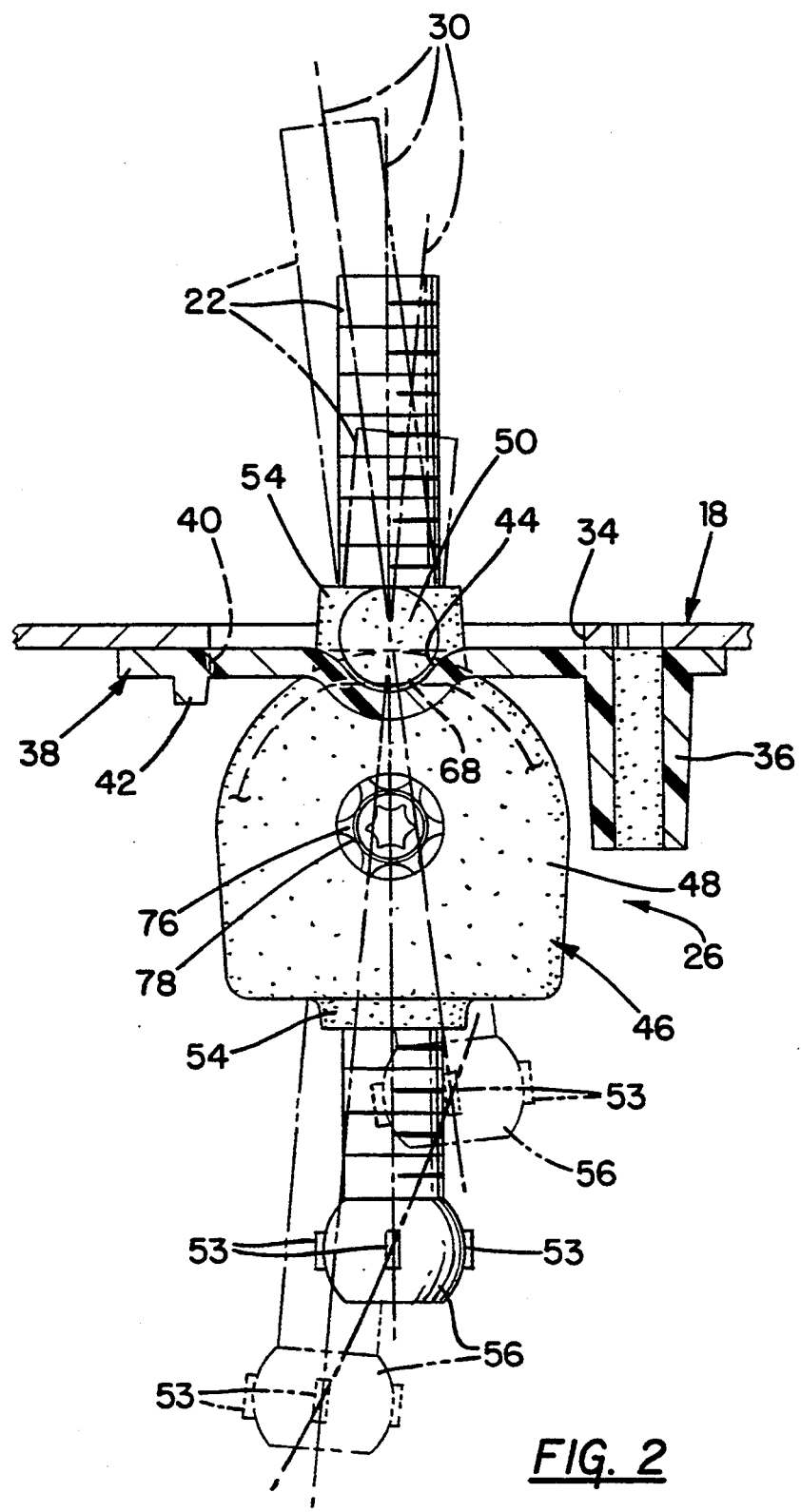
FIG. 2 is an enlarged sectional view of a preferred embodiment of the present invention with various operational positions shown of the adjuster being utilized.
Figure 3:
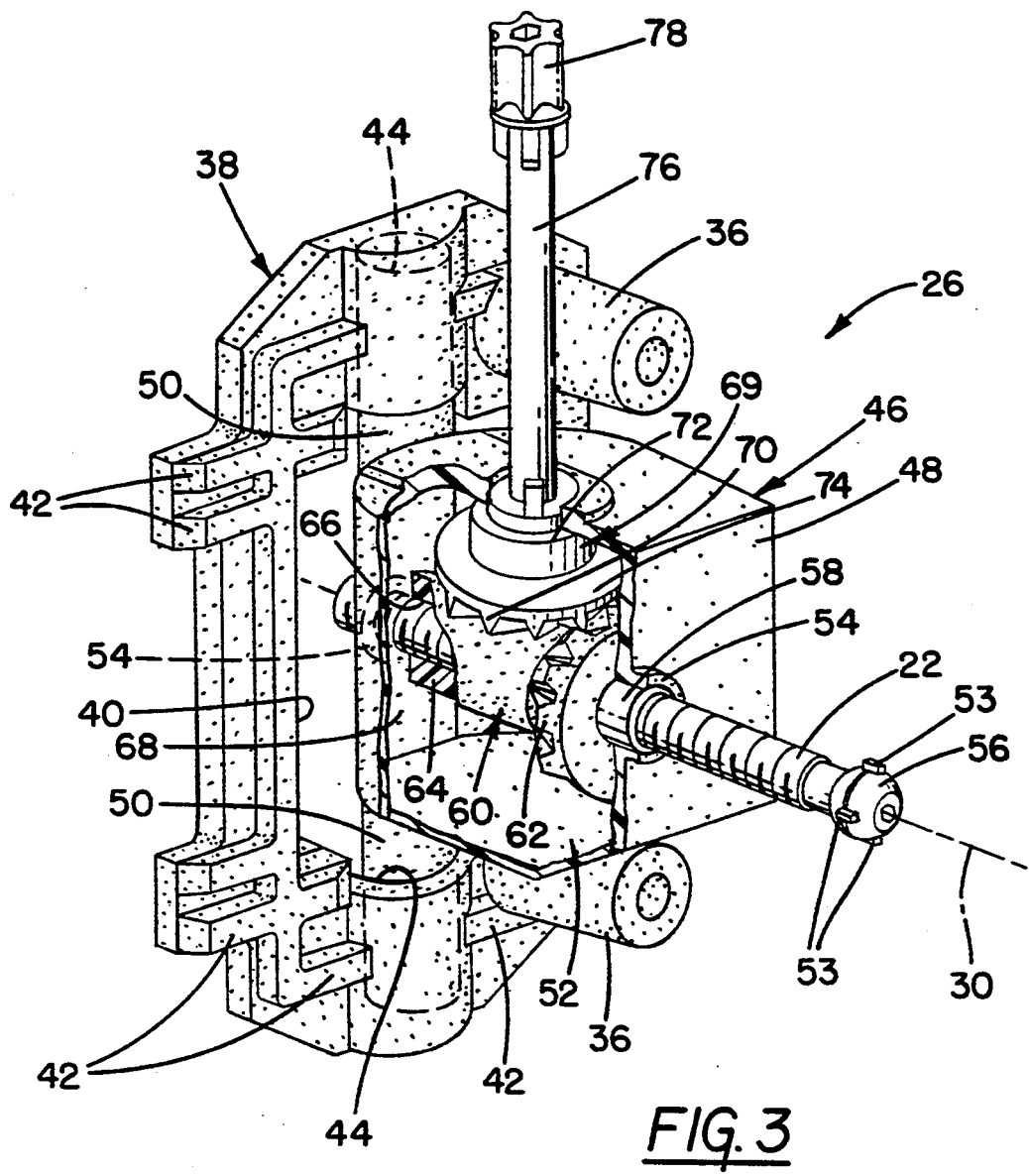
FIG. 3 is a side elevational perspective view of the adjuster unit shown in FIGS. 1 and 2 with portions sectioned for clarity of illustration.

Referring to FIGS. 1, 2 and 3, a left front headlamp assembly 10 which utilizes the present invention has a dual reflector housing 12. As shown, the reflector housing has two bulbs 14 providing a source of illumination. Fixably attached to the reflector housing 12 is a lens 16. As shown, the lens 16 is fixably connected to the reflector housing 12; however, in an embodiment not shown, the lens 16 may be fixably connected to a portion of the car body directly. A separate lens 15 for the turn indicator is directly connected to the car body.

The reflector housing 12 is connected to the vehicle body via a vehicle body panel 18 by a fixed pivot rod (not shown), a vertical adjuster rod 20 which is positioned directly above the fixed pivotal rod, and a horizontal pivotal rod 22. Associated with rod 20 is a vertical adjuster 24. The vertical adjuster 24 is connected to the housing 12 near the housing's upper or top end. Associated with the adjuster rod 22 is the horizontal adjuster 26. The horizontal adjuster 26 connects with the housing 12 near its lower end, generally at the same elevation as the fixed pivot point (not shown).

The vertical adjuster 24 has an axis 28 which is generally parallel to the axis of the fixed pivot rod. The horizontal adjuster 26 has an axis 30 which may or may not be generally parallel to the axis 28, depending on the design constraints of the vehicle.

The vehicle body panel 18 has a stamped depression 32. The vehicle panel also has a hole or opening formed by perforation or stamping 34. Attached to the vehicle panel 18 by fasteners (not shown) through a pair of bosses 36 is a mounting panel 38. The mounting panel is typically made as a stamped cold rolled steel or from plastic material and has a central aperture 40. The mounting panel 38 also has a series of rib reinforcements 42 axially aligned with one another. The mounting panel 38 has two cylindrical surfaces 44 which face toward the body panel 18 of the vehicle. The aperture 40 of the mounting panel 38 is positioned to register with the opening 34 of the vehicle panel 18. The cylindrical surfaces 44 are axially aligned with one another.

A housing 46 has a main body 48 and upper and lower integrally connected rods 50. The upper and lower rods 50 are captured between the vehicle panel 18 and the cylindrical surface 44 of the mounting bracket 38 for pivotal movement with respect thereto. The housing 46 has a lower pivoting door 52 which pivots open to allow for insertion of the remaining members of the adjuster 26. The housing is typically made from a thermoset plastic material. The housing 46 at its front and rear ends has a bearing 54 which mounts the threaded rod (sometimes referred to as a drive screw) 22.

Rod 22 at its end adjacent to the reflector housing 12 has a ball 56 which is pivotally connected to the housing 12 along two axes. The ball 56 also has a series of ribs 53 which prevent rotative movement of the rod 22 with the reflector housing 12. The bearing 54 if desired may have an optional metallic insert 58. However, most applications will not require such an insert. Threadably encircling the rod 22 is a nonmetallic polymeric gear and integral gear 60 having a tooth portion 62 along with a bushing 64. The bushing has a bore 66 which provides an interference fit on fitted rod 22. Since the bushing 64 is a nonmetallic material, simple rotational insertion of the rod 22 into the bushing 64 will self-thread the bushing 64 to the rod 22. The bushing 64 will have a snug fit inside the housing 46 having a rear end generally flush with a flat rear wall 68 of the housing (best shown in FIGS. 2 and 3).

Mated with the toothed portion 62 of the gear 60 is an input gear and drive shaft 69. The input gear 69 has a toothed wheel 70 fixably connected to a torsion input shaft 76. The input shaft 76 extends upward until it can be conveniently reached by an operator or an automatic aiming machine at an assembly plant having a head 78 for receipt of a wrench or an allen wrench. The toothed wheel 70 of the input gear 69 is meshed with the toothed portion 62 of the gear 60 to impart torsion to the same. As shown, the input gear 69 has an optional shoulder 72 limiting its upward positioning. The bushing 64 provides a downward limit on the positioning of the input gear 69, thereby entrapping the input gear 69 in position. In an embodiment not shown, a top surface 74 of the toothed wheel 70 provides an upper stop surface to fix the upper position of the input gear 69.

To assemble the gears 69 and 60 into the housing 46, the lower floor 52 is pivoted open downwardly. The input gear 69 is then pushed upward into position. The gear 60 is then placed in position and threadably inserted on rod 22 with the ball 56 pointed toward the reflector housing 12. As mentioned previously, the antirotative feature of the rod 22 will be accomplished at the ball connection 56 of the rod with the housing 12. The above assembly will cause a tight meshing between the gears 60 and 69 and will not succumb to self-adjustment due to the vibration of the automobile.

Referring to FIG. 2, the axis 30 will pivot as adjuster 22 adjusts the housing 12 in the horizontal plane. The pivoting of the axis 30 will also correspond to the pivoting of the housing 46 with respect to the panel 38 and the panel 18 of the vehicle. Therefore, binding will not occur even when the mounting of the axis 30 of the horizontal adjuster is inclined with respect to the axis 28 of the vertical adjuster.

The workings of the vertical adjuster 24 generally correspond to the workings of the horizontal adjuster 26. However, typically the adjuster 24 will not need as long an input shaft for its second gear 69.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A headlamp assembly having a lamp unit mounted on a panel of a vehicle, a first adjustment device and a second adjustment device located between the support panel and the lamp unit for adjusting the lamp unit in a vertical plane and in a horizontal plane, respectively, for aiming a light beam emitted by a light source, at least one adjustment device comprising:
    a mounting panel connected to the vehicle panel, the mounting panel having an aperture, and upper and lower ends of the mounting panel providing linearly aligned cylindrical surfaces facing the vehicle panel;
    a housing fixably connected with projecting upper and lower rods for pivotal entrapment in the cylindrical surfaces of the mounting panel, allowing pivotal movement of the housing with respect to the vehicle panel;
    a drive screw mounted by the housing and projecting therefrom having an end pivotally connected to the lamp unit; and
    a first gear mounted within the housing, the first gear threadably encircling the drive screw, rotation of the first gear causing translational movement of the drive screw.

2. A headlamp assembly as described in claim 1 wherein the vehicle panel has an opening in registration with the aperture of the mounting panel and wherein the drive screw may extend into such opening.

3. A headlamp assembly as described in claim 1 wherein the adjustment device has a second gear mounted within the housing, the second gear being for imparting a torque to the first gear and the second gear having connected thereto an input shaft extending from the housing, allowing for impartation of torque to the second gear.

4. A headlamp assembly as described in claim 3 wherein the adjustment device further includes a bushing fixably connected to the first gear, the bushing holding up the second gear in position.

5. A headlamp assembly as described in claim 3 wherein the adjustment device housing has an open end at the bottom for loading the first and second gears.

6. A headlamp assembly as described in claim 1 wherein the adjustment device has a mounting panel with reinforcing ribs.

7. A headlamp assembly having a lamp unit mounted on a panel of a vehicle having an opening, a first adjustment device and a second adjustment device located between the support panel and the lamp unit for adjusting the lamp unit in a vertical plane and in a horizontal plane, respectively, for aiming a light beam emitted by a light source, at least one adjustment device comprising:
    a mounting panel connected to the vehicle panel with an aperture for registration with the opening of the vehicle panel, the mounting panel having upper and lower ends providing linearly aligned cylindrical surfaces facing the vehicle panel;
    a housing fixably connected with projecting upper and lower rods for pivotal entrapment in the cylindrical surfaces of the mounting panel, allowing pivotal movement of the housing with respect to the vehicle panel, a rearward portion of the housing extending into the vehicle panel opening;

a drive screw mounted by the housing and projecting therefrom having an end with a ball pivotally connected to the lamp unit in a nonrotational fashion;

a first gear with a connected bushing mounted within the housing, the first gear threadably encircling the drive screw being formulated from a nonmetallic material having a bore providing an interference fit with the drive screw, the rotation of the first gear causing translational movement of the drive screw; and a second gear mounted within the housing and held in position by the bushing of the first gear, the second gear being enmeshed with the first gear for imparting a torque to the first gear and the second gear having fixably attached thereto an input shaft extending from the housing for receipt of torsional input to the second gear.

* * * * *